Figure 1:
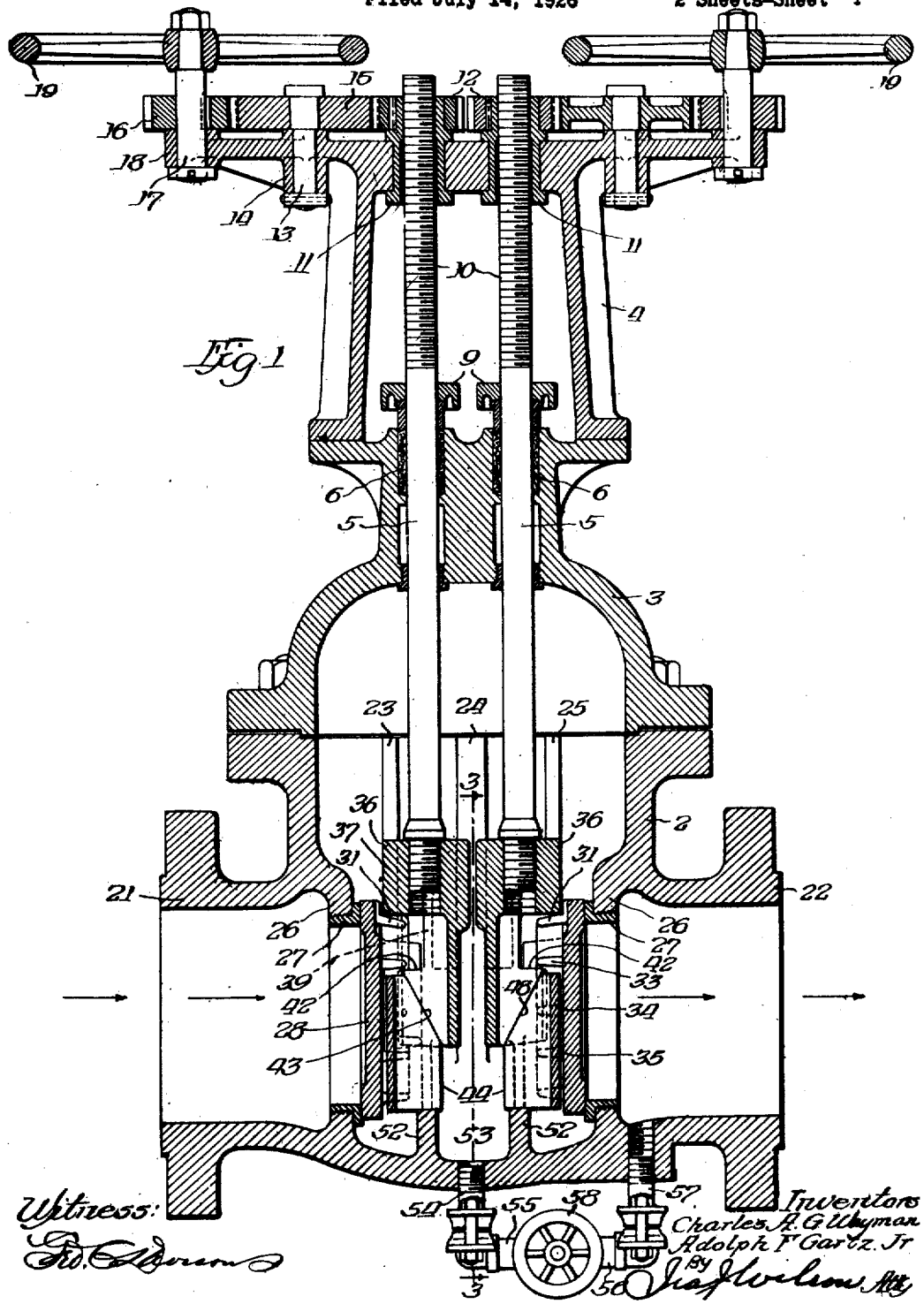

Sept. 18, 1928. 1,684,651

C. A. G. WAYMAN ET AL

VALVE

Filed July 14, 1926 2 Sheets-Sheet 1

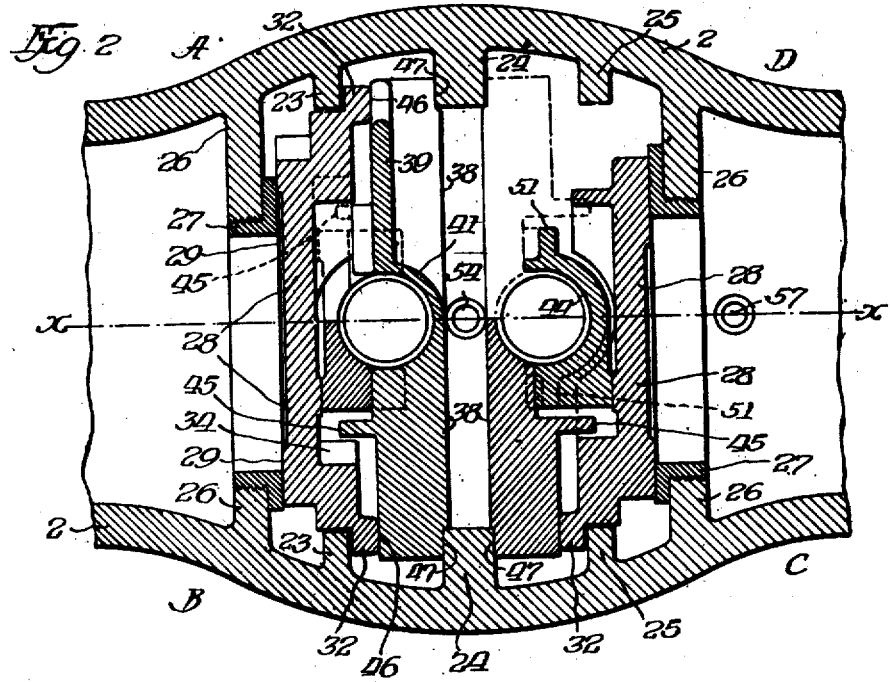
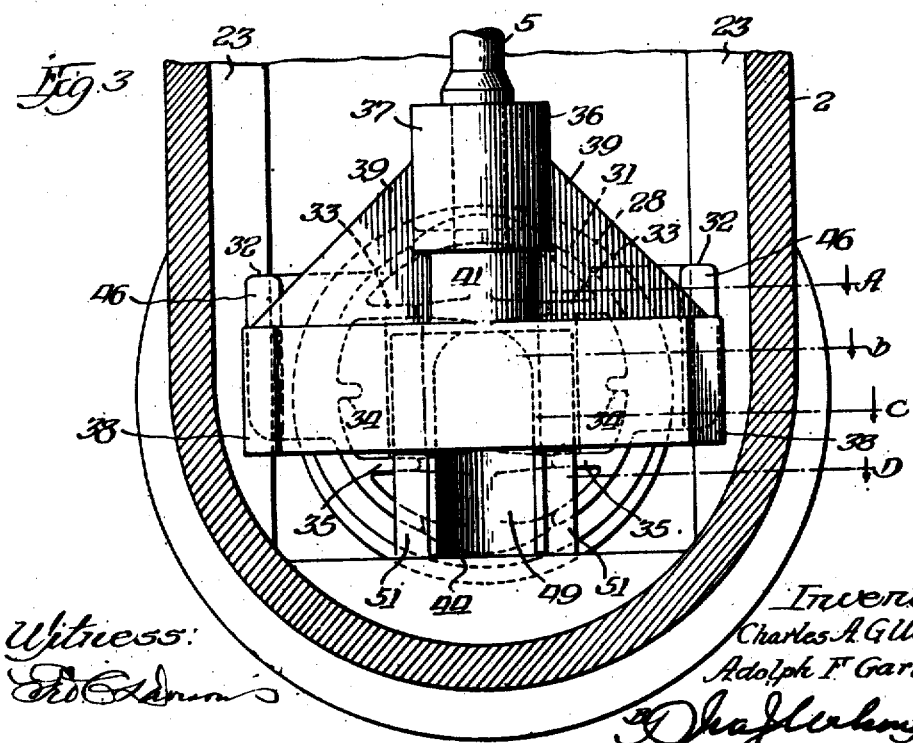

Patented Sept. 18, 1928.

1,684,651

UNITED STATES PATENT OFFICE.

CHARLES A. G. WAYMAN AND ADOLPH F. GARTZ, JR., OF CHICAGO, ILLINOIS, ASSIGNORS TO CRANE CO., OF CHICAGO, ILLINOIS, A CORPORATION OF ILLINOIS.

VALVE.

Application filed July 14, 1926. Serial No. 122,285.

The invention hereinafter disclosed pertains generally to fluid control valves and more particularly to gate valves for high velocity or large capacity steam or water mains and the like.

The development of great cities, communities, and industries has necessitated increased facilities for handling and supplying water, steam and other fluids for power, household, and other uses. This has in turn required piping of enormous capacity both as regards velocity and as regards volume, and, of course, controls, such as valves and the like, adequate to withstand and operate satisfactorily under the pressures developed. Little difficulty, comparatively is experienced in providing suitable piping for such heavy duty, but many obstacles and troublesome difficulties have been encountered in providing valves of the proper character that are in any wise satisfactory for any reasonable period of use.

The chief difficulties or troubles encountered with all valves for heavy duty work which are known to us are undoubtedly so well known as to need but the most hasty comment. For ease of reference and because we have chosen that mode of illustrating our invention, we will briefly discuss the insufficiencies of the average gate valve.

Primarily, gate valves are inherently unbalanced, that is, the pressure is unequal on opposite sides of the gate, with the result that during opening and closing movements of the gate, dependent upon the direction of fluid flow, the gate is either pressed tightly against its seat or there are torsional, bending and other stresses imposed on both gate and stem, etc. When the gate rubs or draws across its seat, fine particles of grit and other débris effects a grinding and cutting action on the seating surfaces. This cutting or grinding of the seating surfaces naturally increases with the pressure urging the gate towards its seat. When the pressure of the fluid tends to urge the valve away from its seat, wire drawing, and wear on the valve operating parts increase, and there is sufficient stress imposed on the gate and the operating mechanism to ofttimes seriously strain them. To our knowledge no one has successfully combated these problems.

The invention of this application, as will be clearly apparent from the description of a preferred embodiment thereof illustrated in the drawings, has for its principal object the provision of a valve in which the pressure on the valve closure member is so equalized as to overcome the above stated defects.

Other objects, such as the provision of a simple and efficient structure, easy to construct, operate, and maintain, will or should be readily appreciated after reading the following description and claims and after viewing the drawings in which:—

Fig. 1 is a vertical sectional view through a gate valve embodying our invention, Fig. 2 is a quadruple sectional view, the respective quadrants designated A, B, C and D being taken on the lines A, B, C and D of Fig. 3, looking in the direction of the arrows, and, Fig. 3 is a broken section through the valve body taken on the line 3—3 of Fig. 1.

The valve generally comprises a valve body 2, a bonnet 3, and a yoke 4. Suitably journalled within the bonnet 3 and between the yoke arms 4 are valve stems 5, surrounded by packing 6 provided in suitable glands in the bonnet in order to make the valve bonnet fluid-tight. The packing 6 is retained and compressed within the stuffing boxes by gland flanges 9. At their upper ends and for a substantial distance therealong, depending upon the necessary distance of travel of the stems upwardly to open and close the valve ports, the stems are threaded, as shown at 10, for cooperative threaded engagement with rotatable bushings 11, mounted in the yoke 4, and each is provided with a pinion gear 12 keyed thereto at its upper end. Since both sides of the valve about the vertical axis and all associated parts are symmetrical, except as hereinafter noted, a description of one side should be sufficient.

A suitable stub shaft 13 is journalled in a boss 14 formed on the yoke and has keyed to it a gear 15 meshing with a pinion 12 and also with a pinion 16 keyed to a stub shaft 17 journalled in a second boss designated 18 in the yoke, while a handwheel 19 is provided on the stub shaft 17 in order that the chain of gearing and thus the bushing 11 may be driven to raise or lower the gates. While both sides of the valve (viewing Fig. 1) are symmetrical with respect to one another, they are wholly independent during raising and lowering movements except in so far as they may react to fluid pressures. In other words, either valve stem is operated through its associated gearing, independently of the other.

The body 2 is provided with inlet and outlet connections 21 and 22 respectively, and on its interior is provided with vertical guide ribs, three in number, 23, 24, and 25, on each side of the center line X—X of Fig. 2, for a purpose to be hereinafter described, and with interior circular flanges 26 about the inlet and outlet adapted to be tapped or otherwise prepared for the reception of valve seat members 27. Each valve gate or closure member 28 has a seating surface 29 adapted to cooperatively engage and seat against a seating surface formed on the valve seat 27 and is constructed and arranged in connection with other mechanism to be described so that it may be withdrawn from the seat and then raised vertically within the body and bonnet and vice-versa on closing movement as will hereinafter appear.

Each gate or closure member 28 is provided with a recessed back formed by a circular rib 31 which is cutaway at the top and bottom to clear certain portions of the operating mechanism as will be later seen, while lateral wings 32 formed preferably as shown in the drawings, extend behind the ribs 23 and 25 for sliding and guiding engagement therewith. Projecting into the recess in the rear face of each gate member 28 and from opposite sides thereof, are ribs 33, 34 and 35, which serve the functions of guiding and retaining the closure members and operating mechanism within certain relative limits with respect to one another and cooperate with suitable shoulders, ribs and projections formed on the valve operating members or gate opening and closing mechanism for the purpose.

Detachably secured to each valve stem 5 is what we shall term an upper operating or wedging member or gate, generally designated 36. At its upper portion, designated 37, the member 36 is substantially cylindrical, and due to the cutaway portion of the rib 31 on the back of the valve gate, it passes freely for a limited distance therethrough in operation. The portion 37 is connected to a bottom portion designated 38 by webs 39 and 41, formed integral therewith, while the bottom portion 38 is provided with a shoulder 42 adapted to engage behind or beneath ribs 33 for lifting the gate after the wedging pressure effected by the member 36 and the lower wedging member to be described has been released. The web 41, as will be best noted from Fig. 2, is preferably formed in circular shape to provide lightness of structure and to permit longer stems to project therein, if necessary, and on either side thereof the member 38 is provided with a downwardly and inwardly tapered face 43 which cooperates with a similar face formed on each of the lower wedging members, generally designated 44. The tapered faces 43 are so formed as to leave vertical side ribs 45 adapted to limit lateral movement of the upper wedging member and gate relatively to one another. For this purpose, engaging with the ribs 34 formed on the gates, the lower portion of the upper wedging member also extends laterally as will be most clearly noted from Figs. 2 and 3, where it engages with the rear faces of wings 32 as shown at 46, and engages with the side faces of rib 24 as shown at 47 to affect a wedging action against the gates during the closing movement.

The lower wedging member 44 has spaced bevelled surfaces designated 48 cooperative with the bevelled surfaces 43 of the upper wedging member with a circular web portion 49 and side web portions 51 for limited guided sliding movement between the ribs 35, while a shoulder is formed on either side of this lower member adjacent the rear face of the gate for engagement behind the ribs 35 so that when the gate is lifted by the upper wedging member 36 and its lifting mechanism, the ribs 35 will serve to lift the lower wedging member also.

It will be noted from Fig. 1 that the lower part of the body 2 is provided with spaced ribs 53 which serve as abutment stops or limits for the downward movement of the lower wedging members 44 and the wedging members and the port closure members are spaced apart in order to provide a chamber 53 therebetween. For the purpose of relieving any fluid pressure which may build up within the chamber 53 as will more clearly appear from the following description of the operation, a by-pass from the chamber to the outlet or delivery side is provided. This by-pass may be of any suitable construction and comprises piping including pipes 54, 55, 56, 57 and a valve 58, as shown in Fig. 1, but omitted from Fig. 3 for the sake of clearness. It will, of course, be understood that if, for any reason, it should be necessary to construct the valve with a double by-pass for reversible operation of the valve, suitable connections could be made between the pipe 55 or 54 and the inlet port or connection 21.

Assuming that the valve parts are in the position illustrated in Fig. 1, which is the closed position, the first step is to open the by-pass valve 58 in order to relieve any built-up pressures within the chamber 53 which accumulate therein through leakage. While the by-pass valve remains open, the downstream disc or gate or port closure member 28 is opened to full open position, and this is accomplished by rotating the hand-wheel 19, associated therewith. As the stem begins to rise, it at first merely raises the upper wedging member 36, since there is sufficient clearance between the shoulders 42 and the ribs 33 to permit it to do so. This relieves the wedging pressure against the lower wedging member 44 so that the valve disc or gate is no longer urged tightly against its seat and further movement of the stem upwardly raises the valve through engagement of the shoulder 42 with the rib 33 and the lower wedging member through engagement of its shoulder with the top of the lower disk rib 35. Since the wings 38 of the upper wedging member are guided by the ribs 24 and thereby held in position and the lower wedging member is retained between the vertical side ribs 45 the latter cannot become displaced during the raising or lowering movement of the gate.

After the downstream or outlet gate has been raised, the upstream or inlet gate is raised in the same manner, but as the pressure of the fluid against the outer face of the disc or gate 28 is permitted to urge the gate slightly inwardly because of the amount of clearance afforded by the release of the wedging members from one another, the gate will rise without dragging or scraping across its seat 27. This same result is substantially had with the downstream or outlet gate by reason of the provision of the by-pass valve.

In closing the valve, the operation is reversed, the upstream or inlet valve being closed first. During this operation, the upper and lower wedging members with the gate are lowered until the lower wedging member hits the abutment stop or limit 52, at which point the gate will not be in contact with its seat, providing a small amount of clearance because of the pressure of the fluid against it; but further movement of the upper wedging member downwardly thereafter, through cooperative wedging action with the lower wedging member, urges the gate directly toward its seat. The downstream or outlet valve is then closed in a similar manner and preferably last the by-pass valve 58 is closed.

From the foregoing it is believed that the novelties, peculiarities and advantages, as well as the functions of the several mechanisms and their operation as a whole will be clearly appreciated and understood and it will also be apparent that many modifications and embodiments of the invention may be made which will differ radically from the illustrated structure without departing from the spirit of the invention or the scope of the appended claims.

We claim:

1. A valve mechanism comprising, a body provided with an inlet port and an outlet port and a chamber between said ports, spaced port closure members within said chamber, one for each of said ports, means for moving said closure members independently of one another to open said ports successively, and but two cooperative wedging elements for each of said closure members, said elements being independent of the closure members but releasably connected thereto and each element of each pair cooperative with the other element of its pair for wedging against the other for wedging their respective closure members into tight closing positions at the end of the closing movements of the closure members.

2. A valve mechanism comprising, a body provided with a chamber and an inlet port to and an outlet port from said chamber, a valve seat in each of said ports, independent valves in said chamber each cooperative with a seat for opening and closing said ports, independent means for moving said valves to port open and port closed positions successively, and two wedging elements only for each of said moving means and cooperative with one another toward the end of the port closing movements of each of said valves for urging said valves toward said seats in registering position therewith, one of each pair of said elements being substantially rigid with said moving means and the other loosely but securely associated with the first of its pair and its respective valve.

3. A valve mechanism comprising, a body provided with a chamber having an inlet port thereto and an outlet port therefrom, a valve seat about each of said ports, independently operative valve gates in said chamber each cooperative with a seat for opening and closing said ports, means for independently moving said gates to port open and port closed positions, and means connected to each gate moving means for urging said gates toward their seats in registering position therewith toward the end of the port closing movement of said gate, said means comprising for each gate only two wedging elements one substantially rigidly secured to the moving means for the gate and having a wedging face and the other loosely but securely connected to the first and to its respective gate and having a wedging face cooperative with the wedging face of the first.

4. The method of operating a gate valve having independently operable inlet and outlet gates and a by-pass valve connection opening into said valve between said gates comprising, opening said by-pass valve connection to relieve built-up pressure between said gates, opening the outlet gate while the inlet gate remains closed, and thereafter opening the inlet gate.

5. The method of operating a gate valve having independently operable inlet and outlet gates and a by-pass valve connection opening into said valve between said gates comprising, opening said by-pass valve connection to relieve built-up pressure between said gates, opening the outlet gate while the inlet gate remains closed, and thereafter opening the inlet gate, and for closing said gate valve, first closing said inlet gate, then said outlet gate and then said by-pass connection.

In witness of the foregoing we affix our signatures.

CHARLES A. G. WAYMAN.
ADOLPH F. GARTZ, Jr.